INVENTOR.
ROMUL E. VUIA
BY John F. Carney

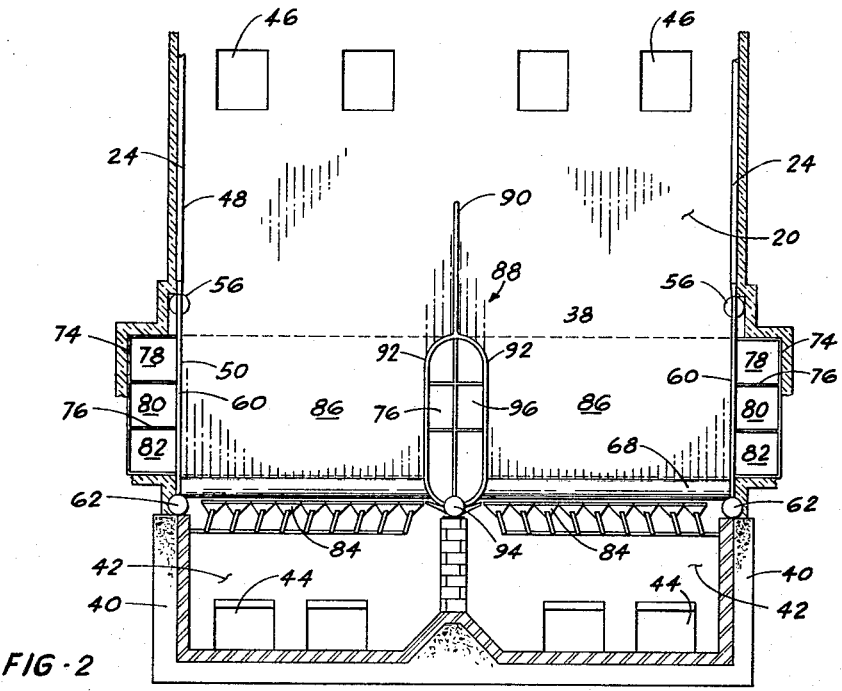

INVENTOR.
ROMUL E. VUIA
BY John F. Carney

United States Patent Office 3,265,038
Patented August 9, 1966

3,265,038
CELLULOSIC FUEL FURNACE HAVING MULTI-CELL BURNING CHAMBER
Romul E. Vuia, Laval sur le Lac, Quebec, Canada, assignor to Combustion Engineering, Inc., Windsor, Conn., a corporation of Delaware
Filed Sept. 29, 1964, Ser. No. 399,994
6 Claims. (Cl. 122—2)

The present invention relates to a vapor generator incorporating a tubular furnace construction provided with means for burning fuel in a pile at the bottom thereof and for the discharge of hot combustion gases into heat transfer relation with steam generating surface forming the furnace walls. More particularly, the invention relates to the construction of a fluid cooled, multicell combustion chamber for a tubular furnace in which cellulosic fuel, such as wood, bark, bagasse and the like, is employed as the principal burning medium. The combustion chamber is bounded by air passage means for delivering combustion air to the fuel, said air passage means being so arranged as to extend, in part, laterally of the width of the combustion chamber thereby dividing the chamber into adjacent cells.

Furnaces having a combustion chamber formed as a plurality of burning cells is old in the art. However, in the past such cells have been formed either entirely, or in great part, by refractory brick as exemplified by the conventional "Dutch oven" type. The use of refractory in furnaces employing cellulosic fuels has been found to be undesirable, first, because of the high initial cost of the refractory material and secondly, because of the outage time and expense required for maintenance of the refractory which is subject to spalling and fluxing by the fuel and ash.

The present invention provides a furnace construction in which the combustion chamber is substantially completely devoid of refractory material. The furnace, including the combustion chamber, is lined with tubular walls which serve as steam generating elements. Thus, in the burning of large amounts of wood waste the construction of a combustion chamber having a plurality of burning cells and the cooling thereof is effected by fluid conducting tubes which are not subject to deleterious effects of high moisture cellulosic fuels as is refractory material.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter which illustrate and describe the preferred embodiments of the invention.

Figure 1:
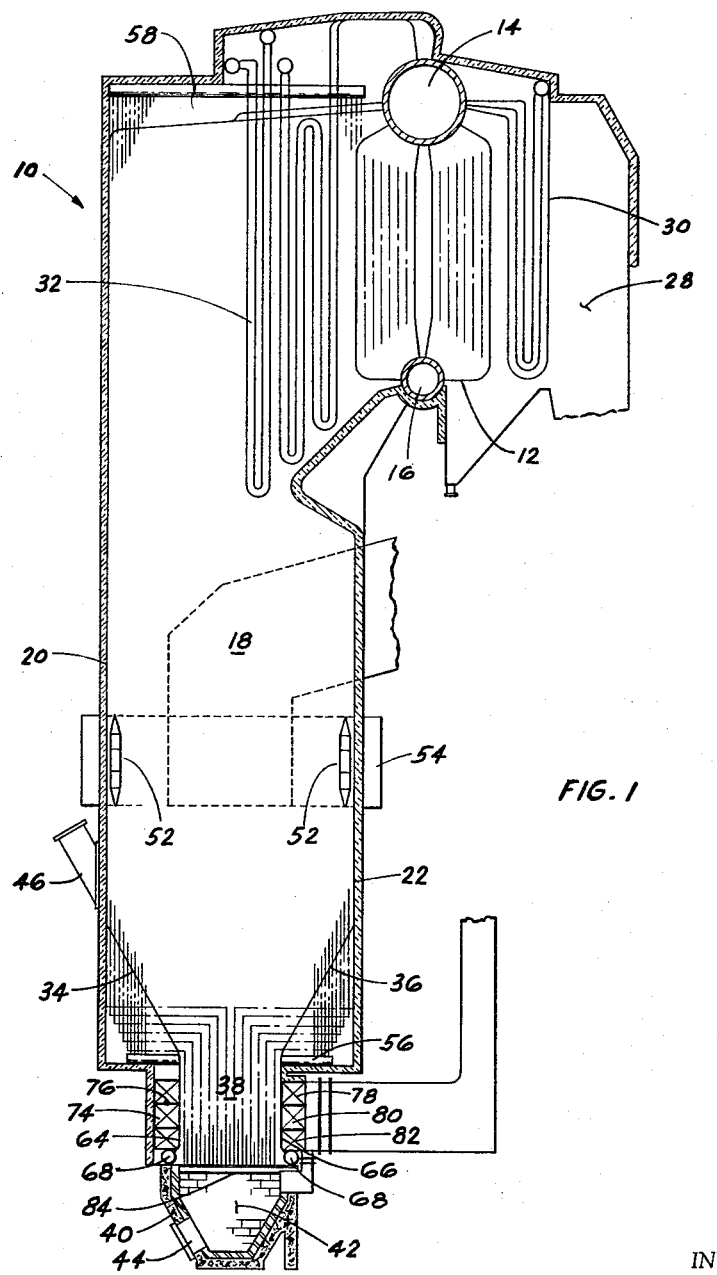
Figure 4:
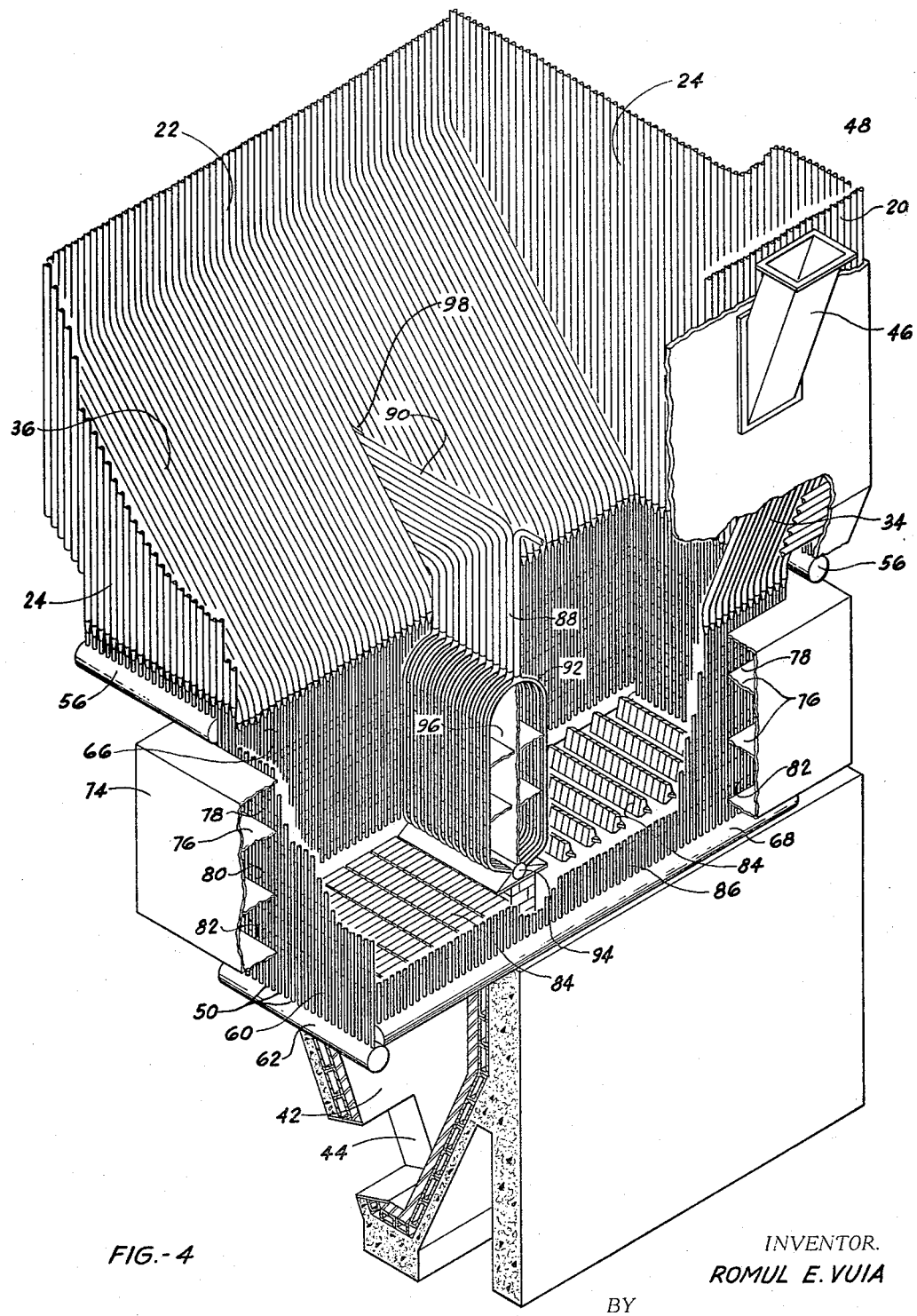
Figure 6:
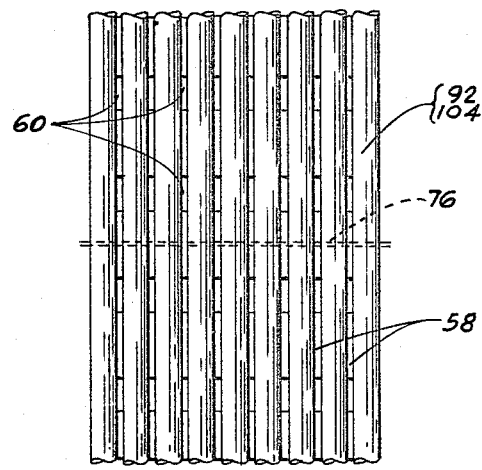
Figure 5:
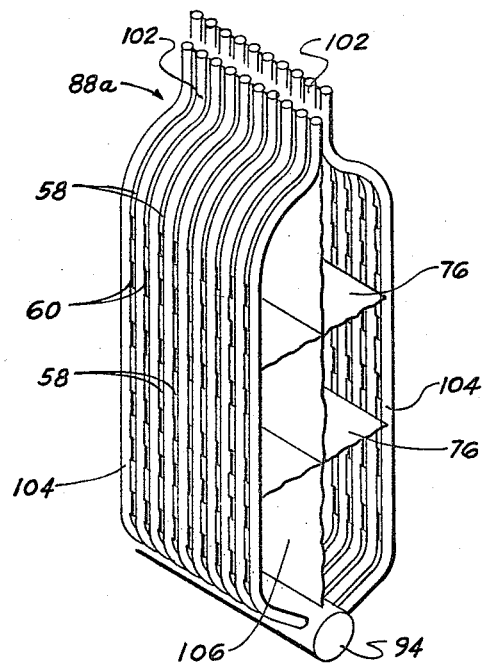

In the drawings:
FIGURE 1 is a sectional elevation of a vapor generator incorporating the present invention;
FIGURE 2 is a partial sectional view of one embodiment of the invention;
FIGURE 3 is a partial sectional view of another embodiment of the invention;
FIGURE 4 is an isometric representation of the embodiment of FIGURE 2;
FIGURE 5 is an isometric representation of the embodiment of FIGURE 3; and
FIGURE 6 is a detailed representation of the tube surface indicated in FIGURES 4 and 5.

In the illustrative embodiment of the invention shown in FIGURES 1, 2 and 3, a wood burning furnace 10 is arranged in association with the natural circulation boiler section comprising a bank of upright tubes 12 having offset ends connected to upper and lower drums 14 and 16, respectively. It is to be understood, however, that the instant invention is equally applicable to boilers employing other than natural fluid circulating systems. The furnace is formed of upright tubular walls which define a furnace chamber 18 and which include a front wall 20, a rear wall 22 and opposing side walls 24. The upper portion of the front wall 20 is extended over the top of the furnace chamber 18 to the drum and forms a roof 26. The rear wall 22 terminates adjacent the lower drum 16, in spaced relation to roof 26, so as to provide a combustion gas outlet passage 28, between drums 14 and 16, through which gaseous products of combustion are discharged from the furnace chamber 18 and directed over the boiler tubes 12. In the gas outlet passage 28 tubes 30 for preheating the incoming feedwater and tubes 32 for superheating the steam emitted from the upper drum 14 may be provided.

The bottom of the furnace chamber is formed by sloping portions 34 and 36 of the front and rear walls 20 and 22, respectively. Below the furnace chamber 18 is located the combustion chamber 38, described in greater detail hereinafter, positioned upon a boiler setting 40 which defines an ash pit 42 and includes an ash removal port 44. The front wall 20 is provided with fuel feeding conduits 46 capable of depositing cellulosic fuel such as wood, bark, bagasse, and the like into the combustion chamber 38. Intermediate the height of the furnace chamber 18 is positioned a plurality of burners 52 capable of burning auxiliary fuel such as pulverized coal, oil or gas. In the arrangement shown in FIGURE 1 the burners 52 are located at the corners formed by the walls 20, 22 and 24 and are adapted for tangential firing within the furnace chamber 18. On the other hand however, the burners 52 could be mounted in opposite walls for opposed firing. An air chamber 54 supplies the burners 52 with combustion air.

All boundaries of the furnace chamber 18 are fluid cooled by means of vertically extending, fluid conducting, tangent tubes 48 associated with the respective walls and through which liquid is circulated in parallel with the natural circulation of liquid through the boiler tubes 12. The tangent relationship of tubes 48 is included here for purposes of description and is intended in no way to limit the inventive concept. For example, other furnace constructions such as fusion welded wall, fin welded membranous wall or integral finned tubed walls can also be employed. The tubes 48 lining the end portions of the side walls 24 connect at their lower end to intermediate headers 56 located at the base of the furnace chamber 18 and at their upper end to upper headers 58. Those tubes lining the center portion of the side walls 24 are reduced in diameter and connect to the upper ends of the tubes 50 lining the combustion chamber side walls 60. These tubes 48 also connect at their upper end to upper headers 58. Steam relief tubes (not shown) connect the upper headers 58 to the upper drum 14. The lower ends of the tubes 48 lining the front and rear walls, 20 and 22, of furnace chamber 18 connect to the upper ends of tubes 50 lining the front and rear walls, 64 and 66 respectively, of the combustion chamber 38. The upper ends of the front wall-lining tubes 48 extend across, and form, the roof 26 and connect to upper drum 14. The upper ends of the tubes 48 lining the furnace chamber rear wall 22 connect to lower drum 16.

The combustion chamber 38 is formed by smaller diameter, fluid bearing tubes 50 which extend into, and form, portions of the associated walls of the furnace chamber 18. The combustion chamber side walls 60 are lined with tubes 50 which connect at their lower end to headers 62 and at their upper end to the lower ends of the tubes 48 which form the center portion of the furnace chamber side walls 24. Swaging of tubes 48 permits the connection with tubes 50. Similarly, the combustion chamber front and rear walls 64 and 66, respectively, are formed by tubes 50 connected at their lower ends to elongated headers 68 and at their upper ends to the lower ends of the tubes 48 forming the sloping portions 34 and 36 of the front and rear walls of the furnace chamber. As shown best in FIGURE 3 the tubes 50 which line the combustion chamber 38, being of a smaller diameter than those, 48, lining the furnace chamber 18 coaxially related thereto are formed with spaces therebetween. These spaces intermediate the combustion chamber tubes 50 are filled with elongated metallic strips 70 which are welded to adjacent tubes and which are provided with openings 72 permitting the admission of air to the combustion chamber 38.

A hot air duct 74 surrounds the periphery of the combustion chamber 38 and is provided with partitions 76 which divide the duct into distinct elevations of air admission which can be controlled by dampers (not shown). In the disclosed arrangement three elevations, 78, 80 and 82, are shown but it should be understood that more or less can be employed. The floor of the combustion chamber 38 is formed of dump grate stokers 84 having sections which can be independently operated so as to enable the removal of spent fuel from one section of the combustion chamber 38 while that in the other section continues to burn.

Division of the combustion chamber 38 into cells, which are indicated as 86, is effected by a partition 88 extending between the front and rear walls 64 and 66 of the combustion chamber and comprising a plurality of vertically extending tubular members which, in the embodiment shown in FIGURES 2 and 3, are bifurcated tubes having a stem portion 90 and leg portions 92. The leg portions 92 of the bifurcated tubes are of a diameter similar to the tubes 50 and are displaced in opposite directions so as to form an air passage or duct 96 through the partition 88. The duct 96 communicates with the hot air duct 74 adjacent the front and rear walls 64 and 66 of the combustion chamber thereby providing means for supplying air through the walls of the partition 88. The lower ends of the tubular legs 92 connect to partition header 94 which extends parallel to the partition 88 between and connecting to the combustion chamber front and rear wall headers 68 thereby supplying the legs 92 with vaporizable liquid.

As shown in FIGURE 3 the leg portions 92 of the bifurcated tubes are of a smaller diameter than the stems 90 which are, in fact, extensions of furnace tubes 48. The legs 92 therefore have spaces therebetween. The so-formed spaces are filled by metallic strips 70 in a manner similar to that in the combustion chamber walls. These metallic strips 70 similarly contain spaced rows of openings 72 to effect communication between the air passage 96 and the cells 68. The tubular stems 90 are angularly offset and extended through an aperture 98 in the sloping portions 34 and 36 of the front and rear walls. This aperture 98 is formed by the lateral displacement of one of the tubes 48 in each of the front and rear walls. At the exterior of the unit the stems 90 are again offset at right angles and alternate tubes extended to the opposed side walls 24 where they are bent into parallel relation with the remainder of the tubes 48 extending from the intermediate headers 56 and forming the side walls 24. By means of this arrangement the partition-forming tubes 90 serve to line a portion of the furnace chamber walls and substantially the entire furnace chamber 18 is left open and unobstructed by tubes forming cells within the combustion chamber such that auxiliary fuel burners arranged for tangential firing can be employed.

The operation of the above described unit is as follows. Feedwater is admitted to the upper drum 14 where it mixes with the separated saturated fluid located therein and flows through downcomer tubes in the boiler bank 12 to the lower drum 16 from whence it is conducted by means of conduits 100 to supply intermediate headers 56 and the headers 62 and 68 at the base of the combustion chamber walls. Partition header 94 is fed by headers 68. From these headers the downcomer fluid is caused to flow upwardly through the tubes 50 lining the walls of the combustion chamber 38, and through those, 48, lining the walls of the furnace chamber 18 where heat is extracted from the gases generated in the furnace chamber 18 transforming some of the fluid into steam which collects in upper drum 14 where separation or other processing occurs before the steam passes into the superheater tubes 32 where an additional amount of heat is extracted from the combustion gases thereby raising the temperature of the steam. From the superheater tubes the steam is removed from the unit and conducted to any point of use.

Fuel in the forms of wood, bark, bagasse, or the like is admitted to the combustion chamber 38 through the feed conduits 46 located in the furnace front wall 20. The fuel is dumped into piles within one or both of the cells 86 upon the stokers 84 where combustion occurs. At the same time hot air is admitted to the hot air duct 74 which surrounds the combustion chamber 38 and to the air passage 96 through the partition 88. Control of air admission to one or more of the air duct elevations, 78, 80, 82 can be maintained through the use of dampers (not shown) which govern the operability of the several elevations formed by the partitions 76. One or more of these elevations is operated depending upon the depth of the fuel pile within the cells 86.

When it is desired to discharge spent fuel from one of the cells 86 the dump grate stoker 84 associated with that cell can be operated to discharge the spent fuel into the ash pit 42 beneath the combustion chamber 38 while the fuel in the other cell can continue to burn.

At the same time as, or independently of, burning within the combustion chamber 38 the auxiliary fuel burners 52 can be fired to generate gases within the furnace chamber 18, which gases similarly flow in a vertical direction through the furnace chamber 18 and thence through the gas outlet passage 28 and on out of the unit into an air preheater (not shown) or other ancillary equipment before egressing from the stack.

In FIGURES 3 and 5 is shown a modified form of the construction of the partition 88 of the embodiment shown in FIGURES 2 and 4. In the modified embodiment the partition, indicated as 88a, is formed of a double row of parallelly arranged, vertically extending, tangent tubes 102. These tubes 102 are of the same diameter as the furnace lining tubes 48 and are, in fact, extensions of some of the tubes lining the furnace side walls 24 similar to the arrangement shown in FIGURES 2 and 4. As shown, the tubes are reduced in diameter as by means of swaging and connected to the upper ends of tubes 104 which form the wall of the air passage through the partition 88a. Each of the tubes 104 in one row are oppositely offset from those in the other row so as to define the walls of the air passage 106. The lower ends of the tubes 104 connect to the laterally extending partition header 94. The tubes 104 being of a smaller diameter than the tubes 102 have spaces located between adjacent tubes. These spaces are filled with metallic strips 58, the strips being weldedly attached to the adjacent tubes 104. Openings 60 are provided to effect communication between the air passage 106 and the cells 86 in a manner substantially the same as that employed in the previous embodiment.

The tubes 102 extend vertically to a level adjacent the top of the combustion chamber and are there substantially horizontally offset such that they extend through the aperture 98 formed in the sloping portions 34 and 36 of the front and rear walls respectively. As can be seen in FIGURE 5, half of the tubes 102 extend through the front wall sloping portion 34 and the other half extend through the rear wall sloping portion 36 to the exterior of the unit. At the unit exterior the tubes 102 are again normally offset with alternate tubes extending to the left and right side walls 24. At the side walls the tubes 102 are in alignment with the tubes 48 forming the side walls 24 and extend vertically along the walls to connect with the upper header 58. Those tubes which extend through the front wall sloping portion 34 are similarly formed and ultimately connect with upper headers 58.

In both embodiments the hot air duct 74 is arranged to receive preheated air within the portion adjacent the combustion chamber rear wall 66 and to deliver such air to various parts of the combustion chamber at regulated rates. Accordingly, dampers are provided to govern the air admission to each or all of the air duct elevations 78, 80 and 82.

Each of the foregoing combustion chamber arrangements provides a structure adapted for operation at relatively high rates of combustion and capable of accommodating cellulosic fuels having a relatively high moisture content. The fuel burning cells are able to receive combustion air around the entire periphery thereby effecting a more uniform and therefore a more efficient burning within each of the cells. This fact additionally results in more intimate mixture of fuel and air which contributes to the burning efficiency that occurs within the combustion chamber. Such construction also permits separate operation of each cell for maintenance purposes, or for the dumping of spent fuel without having to undergo shutdown of the vapor generator.

Moreover, because the partition-forming tubes extend only to the top of the combustion chamber, the entire furnace chamber is unobstructed by any imperforate surface which would otherwise prevent the use of auxiliary fuel burners adapted for tangential firing. So too, the use of opposed burners rather than tangentially oriented burners are also benefited by an unobstructed furnace chamber in that high heat releases can be accommodated in the furnace chamber without the danger of slagging or overheating a tubular surface that would, of necessity, be close to the burners.

Furthermore the invention enhances the burning of fuels having a high moisture content. By locating the watercooled cells in the bottom of a furnace chamber that includes provision for auxiliary burners, the radiant effect of the flame provided by the auxiliary burners is available for drying purposes thereby eliminating much of the moisture from the fuels.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. A vapor generator having rectangularly disposed walls forming a vertically extending, undivided furnace chamber; tubes lining the walls of said furnace chamber; fluid fuel burner means operatively disposed in said walls to fire into said furnace chamber; a combustion chamber adapted to burn piles of cellulosic fuel positioned subjacent to, and in open gaseous communication with said furnace chamber; tubes in fluid communication with said furnace chamber tubes lining the walls of said combustion chamber; means for passing combustion air through the walls of said combustion chamber; partition means dividing said combustion chamber into a plurality of burner cells comprising oppositely spaced rows of tubes extending upwardly from the bottom of said combustion chamber to a height substantially coincident with the top thereof forming a substantially closed air passage between the walls of said combustion chamber, means for passing combustion air from said air passage to said burner cells; tubular extensions connecting with the tubes of said air passage at the uppermost portion thereof and extending upwardly therefrom to a height substantially below said fluid fuel burner means, the upper ends of said tubular extensions being displaced into lateral alignment with said furnace chamber tubes to line a portion of said furnace walls.

2. A vapor generator organization as recited in claim 1 including means forming openings in opposed walls of said furnace chamber adjacent the ends of said air passage, the upper ends of said tubular extensions being passed through said openings to the exterior of said furnace chamber and there displaced into lateral alignment with the furnace chamber tubes to line a portion of said furnace walls.

3. A vapor generator organization as recited in claim 1 including means forming openings in two opposed walls of said furnace chamber adjacent the ends of said air passage, and the upper ends of said tubular extensions being passed through said openings to the exterior of said furnace chamber and there displaced into lateral alignment with the furnace chamber tubes lining the other two opposed walls to line a portion of said other walls.

4. A vapor generator organization as recited in claim 1 wherein the tubes lining said combustion chamber walls and those forming said air passage are mutually spaced; metallic filler means filling the spaces between said tubes and means forming openings in said filler means for passing combustion air to said burner cells.

5. A vapor generator organization as recited in claim 3 wherein said air passage is formed of a row of vertically extending parallelly arranged bifurcated tubes with the legs thereof being oppositely spaced to form the opposed walls of said air passage.

6. A vapor generator organization as recited in claim 3 wherein said air passage is formed of a double row of vertically extending parallelly arranged tubes with the lower portions thereof being oppositely spaced to form the opposed walls of said air passage.

References Cited by the Examiner

UNITED STATES PATENTS

| | | | |
|---|---|---|---|
| 2,305,611 | 12/1942 | Frisch | 122—240 |
| 2,494,608 | 1/1950 | Bumstead | 122—240 |
| 2,637,306 | 5/1953 | Marquez et al. | 122—240 |
| 3,156,219 | 11/1964 | Zoller | 122—235 |

KENNETH W. SPRAGUE, *Primary Examiner.*